(12) United States Patent
Shepherd et al.

(10) Patent No.: US 9,727,635 B2
(45) Date of Patent: Aug. 8, 2017

(54) COMBINED CODE SEARCHING AND AUTOMATIC CODE NAVIGATION

(71) Applicant: ABB Research Ltd., Zurich (CH)

(72) Inventors: David Carroll Shepherd, Raleigh, NC (US); Brian P. Robinson, Cary, NC (US)

(73) Assignee: ABB Research Ltd., Zurich (CH)

( * ) Notice: Subject to any disclaimer, the term of this patent is extended or adjusted under 35 U.S.C. 154(b) by 209 days.

(21) Appl. No.: 13/760,775

(22) Filed: Feb. 6, 2013

(65) Prior Publication Data

US 2014/0222790 A1 Aug. 7, 2014

(51) Int. Cl.
*G06F 7/00* (2006.01)
*G06F 17/30* (2006.01)

(52) U.S. Cl.
CPC .. *G06F 17/30625* (2013.01); *G06F 17/30864* (2013.01); *G06F 17/30867* (2013.01)

(58) Field of Classification Search
CPC ........ G06F 17/30625; G06F 17/30864; G06F 17/30867
USPC ........... 717/100–131; 707/723; 711/100–131
See application file for complete search history.

(56) References Cited

U.S. PATENT DOCUMENTS

| | | | | |
|---|---|---|---|---|
| 5,671,416 A * | 9/1997 | Elson | | 717/106 |
| 6,026,362 A * | 2/2000 | Kim | | G06F 11/3664 705/317 |
| 7,613,693 B1 * | 11/2009 | Na et al. | | |
| 8,589,411 B1 * | 11/2013 | Sung | | G06F 8/33 707/748 |
| 2004/0220947 A1 * | 11/2004 | Aman et al. | | 707/100 |
| 2005/0262056 A1 * | 11/2005 | Hamzy et al. | | 707/3 |
| 2007/0299825 A1 * | 12/2007 | Rush | | G06F 17/30997 |
| 2008/0034351 A1 * | 2/2008 | Pugh | | G06F 11/36 717/128 |
| 2008/0104570 A1 * | 5/2008 | Chedgey et al. | | 717/105 |
| 2009/0178031 A1 | 7/2009 | Zhao | | |
| 2010/0106705 A1 * | 4/2010 | Rush et al. | | 707/709 |
| 2012/0060142 A1 * | 3/2012 | Fliess et al. | | 717/102 |
| 2012/0254162 A1 * | 10/2012 | Asadullah | | G06F 17/30657 707/723 |

(Continued)

FOREIGN PATENT DOCUMENTS

EP 1993036 A2 11/2008

OTHER PUBLICATIONS

Marcus, et al "An Information Retrieval Approach to Concept Location in Source Code." International Proceedings of the 11th Working Conference on Reverse Engineering, 2004. IEEE. p. 1-10.

(Continued)

*Primary Examiner* — Kris Mackes
*Assistant Examiner* — Lin Lin Htay
(74) *Attorney, Agent, or Firm* — Taft Stettinius & Hollister LLP

(57) ABSTRACT

Software code changes are facilitated by receiving as input a user query specifying a search term and automatically generating a ranked list of connected call trees based on the search term. Each connected call tree identifies subroutines that contain an identifier matching at least part of the search term or that are linked to a subroutine that contains an identifier matching at least part of the search term. The ranked list of connected call trees is displayed as a diagram.

15 Claims, 8 Drawing Sheets

(56) References Cited

U.S. PATENT DOCUMENTS

| | | | | |
|---|---|---|---|---|
| 2012/0254835 A1* | 10/2012 | Muddu | ................. | G06F 8/36 |
| | | | | 717/121 |
| 2013/0091387 A1* | 4/2013 | Bohnet et al. | ............... | 714/38.1 |
| 2014/0013304 A1* | 1/2014 | Vangala et al. | ............... | 717/123 |
| 2014/0096112 A1* | 4/2014 | DeLine | ................. | G06F 8/75 |
| | | | | 717/125 |
| 2014/0149435 A1* | 5/2014 | Sisman et al. | ................ | 707/751 |
| 2014/0214812 A1* | 7/2014 | St. John | ........................ | 707/723 |

OTHER PUBLICATIONS

McMillan, et al. "Portfolio: A Search Engine for Finding Functions and Their Usages." Proceedings of the International Conference on Software Engineering, 2011. IEEE. p. 1-3.

Robillard, Martin P. "Automatic Generation of Suggestions for Program Investigation." International Proceedings of the 10th European Software Engineering Conference held jointly with 13th ACM SIGSOFT International Symposium on Foundations of Software Engineering (ESEC/FSE-13). 2005. p. 1-10.

Hill, et al. "Exploring the Neighborhood with Dora to Expedite Software Maintenance." Internaitonal Proceedings of the 22nd IEEE/ACM International Conference on Automated Software Engineering. ASE, 2007. p. 14-23.

Shepherd, et al. "Supporting Search and Navigation through Code Context Models." Technical Report No. IFI-2012.07. University of Zurich, Department of Informatics. Nov. 2012. p. 1-12.

* cited by examiner

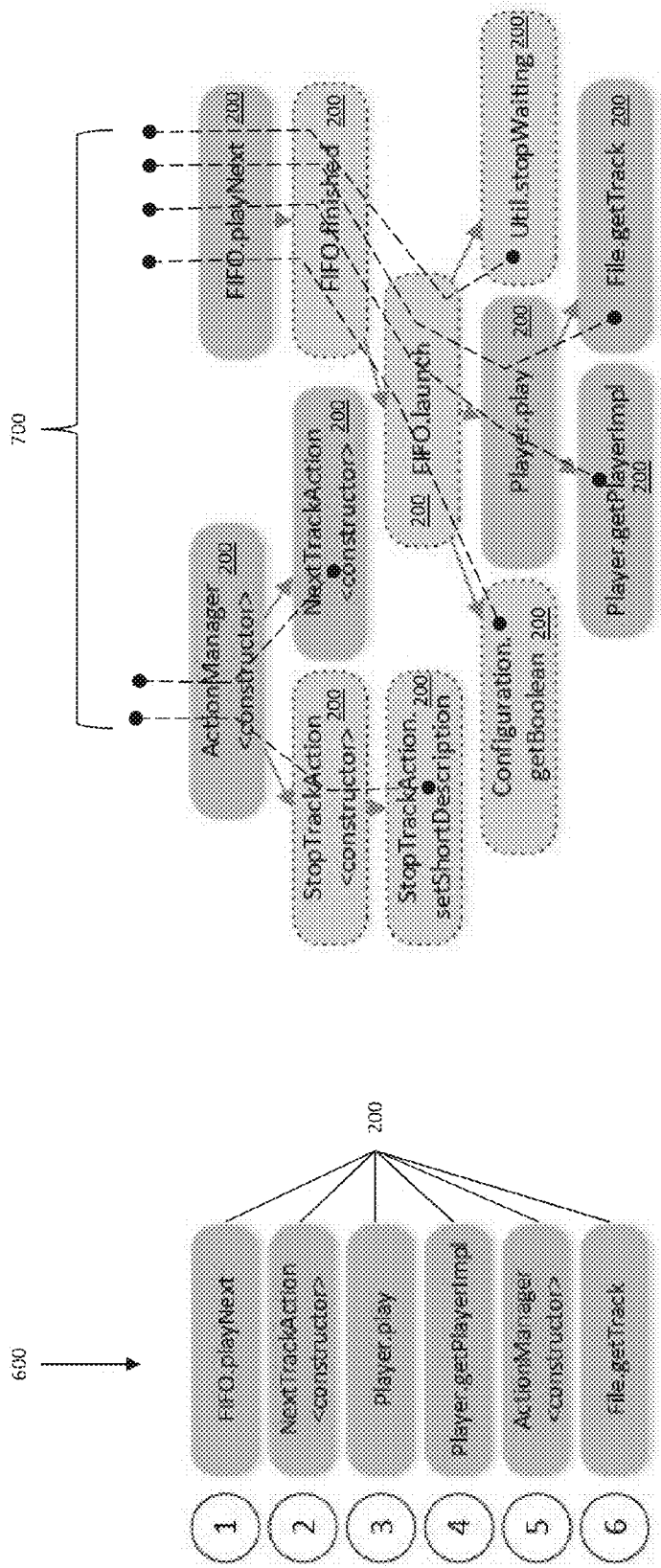

COMBINED CODE SEARCHING AND AUTOMATIC CODE NAVIGATION

TECHNICAL FIELD

The instant application relates to code modification and debugging and, more particularly, to facilitating code changes by code searching and navigation.

BACKGROUND

Software developers spend substantial amounts of time searching and navigating through code to understand relevant parts of a program for a particular change task, such as code modification or debugging. During this process of understanding and then changing code, developers implicitly build code context models that consist of the relevant code elements and the relations between these elements, often more generally referred to as task context. In order to create a task context, developers conventionally search for starting points using a plain text query and then manually expand these starting points by navigating outward from the starting points using structural links, such as call relations. Since code context models mainly stay implicit in the developer's mind and are not persistent, developers must spend a significant amount of time manually re-creating context models for newly assigned change tasks.

SUMMARY

According to embodiments described herein, an approach is provided that combines code search with structured navigation to facilitate the automatic creation of code context models. The approach described herein uses query search results as seeds, explores structural relationships of the seeds, and automatically groups and ranks the resulting structural graphs. By combining the search results with structural navigation context and presenting the results in diagrams, more relevant search results are provided while eliminating manual navigation steps and revisits developers would otherwise perform.

According to an embodiment of a method of facilitating software code changes, the method comprises: receiving as input a user query specifying a search term; automatically generating a ranked list of connected call trees based on the search term, each connected call tree identifying subroutines that contain an identifier matching at least part of the search term or that are linked to a subroutine that contains an identifier matching at least part of the search term; and displaying the ranked list of connected call trees as a diagram.

According to a non-transitory computer readable medium storing a computer program configured to facilitate software code changes, the computer program comprises program instructions to receive as input a user query specifying a search term and program instructions to automatically generate a ranked list of connected call trees based on the search term. Each connected call tree identifies subroutines that contain an identifier matching at least part of the search term, or that are linked to a subroutine that contains an identifier matching at least part of the search term. The computer program further comprises program instructions which display the ranked list of connected call trees as a diagram.

According to an embodiment of a computer system, the computer system comprises a processing circuit configured to receive as input a user query specifying a search term and automatically generate a ranked list of connected call trees based on the search term. Each connected call tree identifies subroutines that contain an identifier matching at least part of the search term or that are linked to a subroutine that contains an identifier matching at least part of the search term. The processing circuit is further configured to display the ranked list of connected call trees as a diagram.

Those skilled in the art will recognize additional features and advantages upon reading the following detailed description and upon viewing the accompanying drawings.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts. In the drawings:

FIG. 6 illustrates a schematic diagram of an exemplary ranked list of subroutines that contain an identifier matching at least part of a search term;

FIG. 7 illustrates a schematic diagram of the code navigation process for the exemplary ranked list of subroutines shown in FIG. 6, with the subroutines represented by dashed boxes corresponding to nodes added by the navigation process;

DETAILED DESCRIPTION

Figure 1:
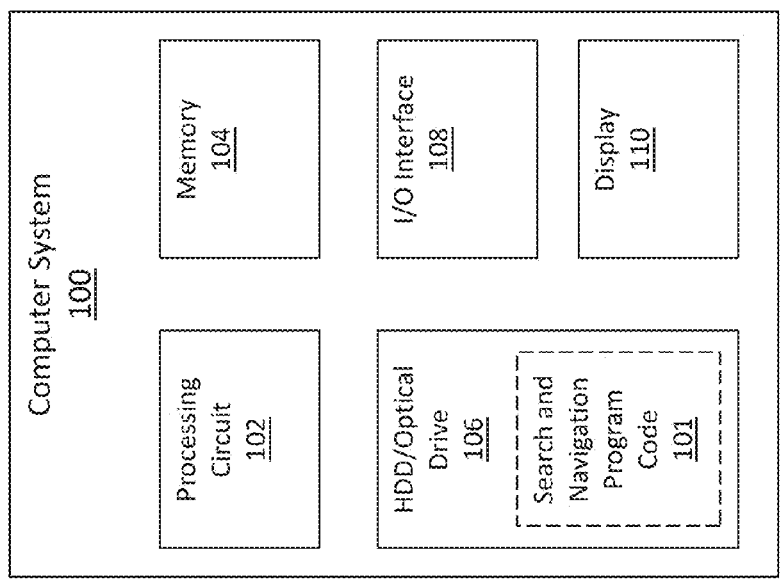
FIG. 1 illustrates a block diagram of an embodiment of a computer system configured to facilitate software code changes.

FIG. 1 illustrates a non-limiting exemplary embodiment of a computer system 100 configured to facilitate software code changes. The computer system 100 includes a processing circuit 102 which can include digital and/or analog circuitry, such as one or more processors, ASICs (application-specific integrated circuits), etc. for executing program code 101, which implements the code search and navigation processes described herein. The computer system 100 also includes volatile and/or nonvolatile memory 104, such as DRAM (dynamic random access memory), FLASH, etc., and an HDD (hard disk drive) and/or optical drive 106 for storing the code search and navigation program code 101 and related data processed and accessed by the processing circuit 102 during execution of the program code 101. The computer system 100 also has an I/O (input/output) interface 108 for sending and receiving information, including receiving user search query data from a developer interested in a change task such as a code modification or code debugging. The computer system 100 has a display 110 such as a monitor, flat screen, touch screen, projector, etc. for visually displaying results of the code search and navigation processes described herein.

Figure 2:
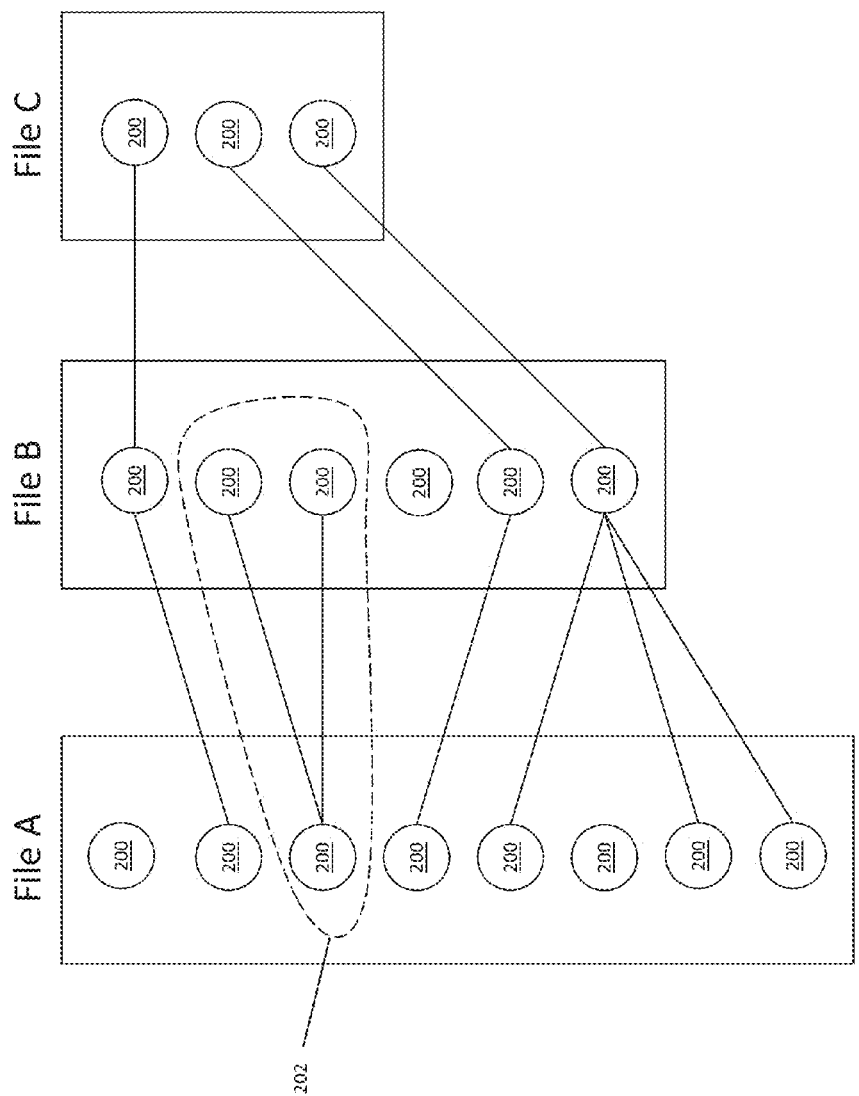
FIG. 2 illustrates a schematic diagram of an exemplary software program which can be searched and navigated by the computer system of FIG. 1.

FIG. 2 illustrates an exemplary software program which can be searched and navigated using the processes described herein. The program includes several files (File A, File B, File C), each of which can be stored by the HDD/optical drive 106 of the computer system 100 and loaded into the memory 104 for access by the processing circuit 102. Each file has source code elements 200 such as packages, classes, or methods, e.g. in Java or other object-oriented programming languages. Source code elements 200 are referred to herein more generally as subroutines 200. Subroutines 200 are sequences of program instructions that perform a specific task, packaged as a unit. This unit can then be used in programs wherever that particular task is to be performed. Subroutines 200 may be defined within programs, or separately in libraries that can be used by multiple programs. In different programming languages, a subroutine 200 may be called a procedure, a function, a routine, a method, or a subprogram.

Various ones of the subroutines 200 are linked together, e.g. by call procedures which are illustrated in FIG. 2 by straight lines connecting one subroutine 200 to another subroutine 200 in a different file. A group of related (linked) subroutines 200 corresponds at least loosely to a code context model built by a developer. In FIG. 2, one such code context model 202 is shown with a dashed oval that encompasses three related (linked) subroutines 200. The search and navigation processes described herein automatically explore and graphically display such code context models based on search query input received from a user.

Figure 3:
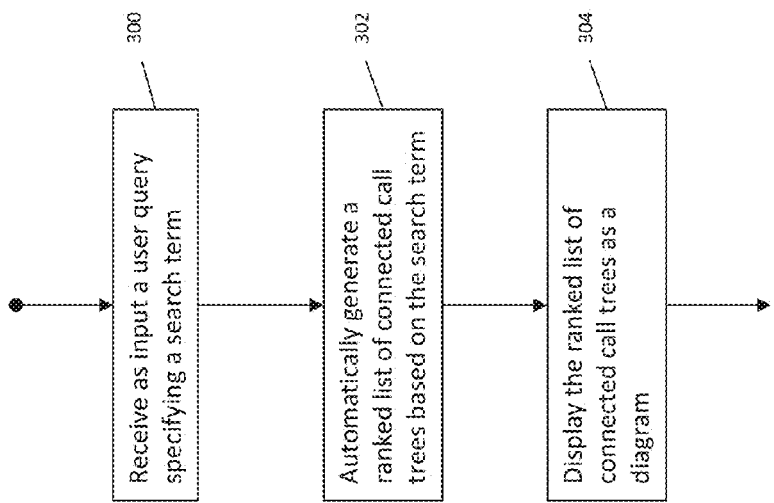
FIG. 3 illustrates a flow diagram of an embodiment of facilitating software code changes.

FIG. 3 illustrates an embodiment of a method of facilitating software code changes using the search and navigation processes described herein, e.g. as executed by the processing circuit 102 included in the computer system 100 of FIG. 1. The processing circuit 102 receives as input a user query specifying a search term (300). The user input is typically in the form of a plain text query. The search term input by the user can contain a single word or more than one word. In either case, the search term can be input by the user via the I/O interface 108 of the computer system 100 and stored in memory 104, so that the processing circuit 102 has access to the search term. Next, the processing circuit 102 automatically generates a ranked list of connected call trees based on the search term (302). Each connected call tree identifies subroutines 200 in the program files of interest that contain an identifier matching at least part of the search term or are linked to a subroutine 200 that contains an identifier matching at least part of the search term. The processing circuit 102 then displays the ranked list of connected call trees as a diagram via the display 110 (304).

Figure 4:
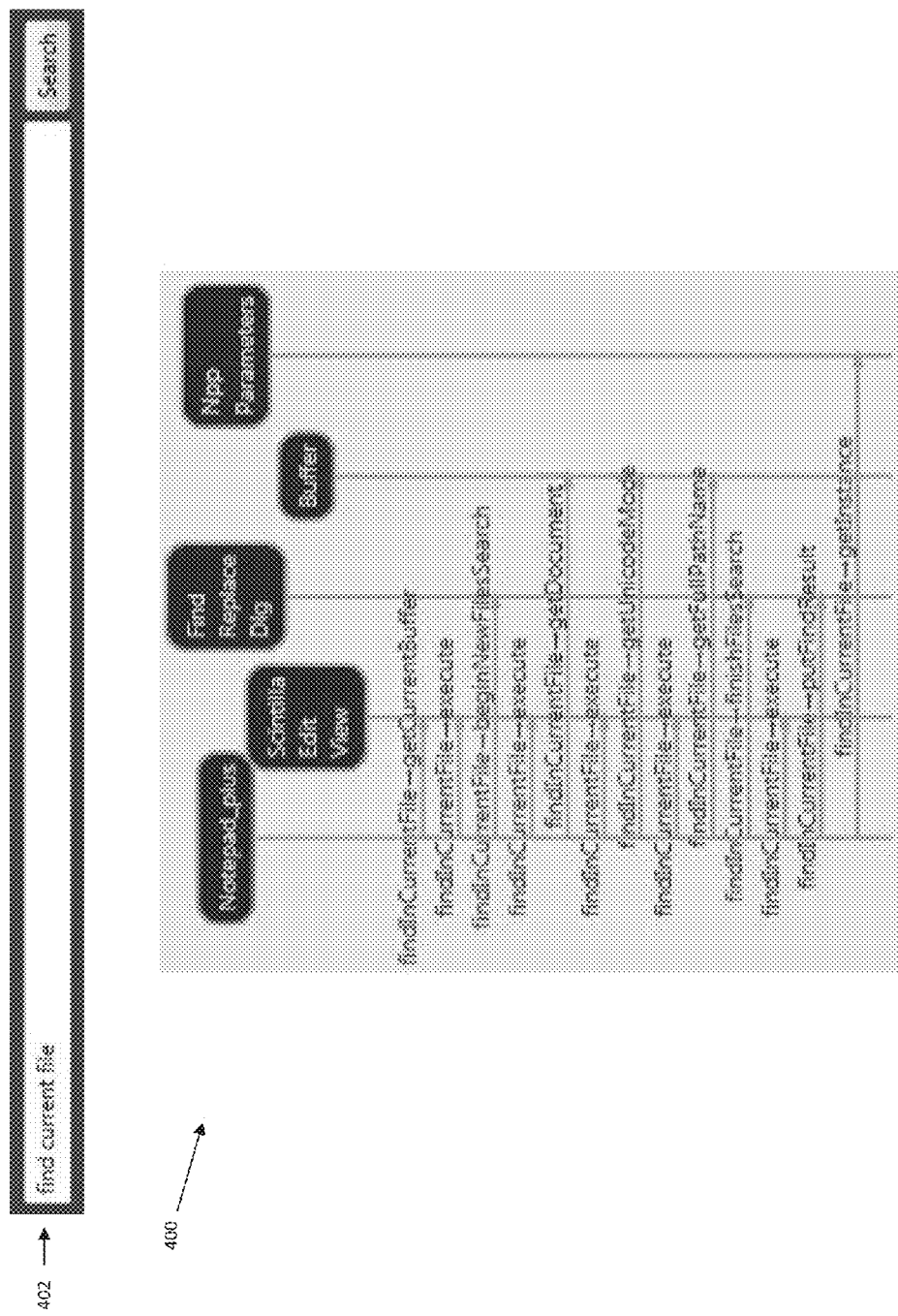
FIG. 4 illustrates a schematic diagram of a single connected call tree, partially displayed as a sequence diagram, which corresponds to the highest-ranked search result.

FIG. 4 shows an embodiment of a single connected call tree displayed as a sequence diagram 400 e.g. via the display 110 of the computer system 100. The single connected call tree corresponds to the highest-ranked search result. Additional sequence diagrams would appear below this one in the search results list. According to this embodiment, the search term input 402 by the user is 'find current file'. The processing circuit 102 navigates program files and generates connected call trees based on this search term. Each connected call tree corresponds to a path of related (linked) subroutines 200 that begin and end with at least part of the search term. The connected call trees are ranked based on relevance to the search term and displayed as a sequence diagram 400. The program files examined during the search process in this example are stored in the HDD/optical drive 106 of the computer system 100 and labeled 'Notepad_plus', 'Scintilla Edit View', 'Find Replace Dig', 'Buffer', and 'Npp Parameters' in FIG. 4. These program files can be stored in memory 104 for faster access by the processing circuit 102.

The ranked list of connected call trees are depicted in the sequence diagram 400 as links from one subroutine 200 in one file to another subroutine 200 in a different file. For example, the subroutine 'findInCurrentFile' in the file 'Notepad_plus' calls (is linked to) the subroutine 'getCurrentBuffer' in the file 'Scintilla Edit View' in the first line of the sequence diagram, the subroutine 'findInCurrentFile' in the file 'Notepad_plus' calls (is linked to) the subroutine 'execute' in the file 'Scintilla Edit View' in the second line of the sequence diagram, etc. The call relations illustrated in the sequence diagram 400 between the different subroutines 200 correspond at least loosely to a developer's code context model, and therefore the sequence diagram is useful to the developer in efficiently making code modifications, debugging, etc.

Figure 5:
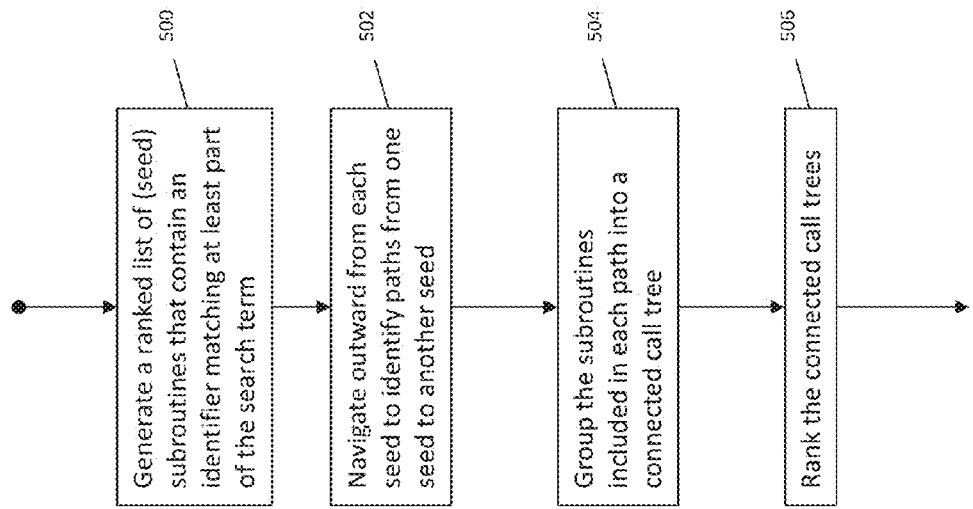
FIG. 5 illustrates a flow diagram of an embodiment of automatically generating a ranked list of connected call trees based on a search term.

FIG. 5 illustrates the search and navigation methods in more detail, e.g. as executed by the processing circuit 102 included in the computer system 100 of FIG. 1. According to this embodiment, the processing circuit 102 automatically generates the ranked list of connected call trees based on the search term. As part of the code search process implemented in support of the code navigation process, the processing circuit 102 generates a ranked list of subroutines 200 in the program files of interest that contain an identifier matching at least part of the search term (500).

FIG. 6 shows an exemplary ranked list 600 of subroutines 200 that contain an identifier matching at least part of the search term. The identifier can be part of the subroutine name or correspond to any code contained in the subroutine. In this example, the search term is 'play next' and there are six subroutines 200 that contain an identifier matching the entire search term 'play next' or part of the search term (e.g., 'play' or 'next'). The subroutines 200 included in the ranked list 600 of subroutines 200 serves as seeds for the code navigation process.

Returning to FIG. 5, the processing circuit 102 navigates outward from each seed (subroutine) in the ranked list 600 of subroutines 200 to identify paths from one seed 200 to another seed 200 (502), groups the subroutines 200 included in each path into a connected call tree (504), and ranks the connected call trees (506). The navigation process takes the search results as seeds 200 and adds subroutines 200 that are found via navigation. In the present example, the outward navigation process starts at the highest ranked seed (subroutine) 'FIFO.playNext' in the list 600 shown in FIG. 6, explores structurally related code elements, and finds that subroutines 'FIFO.launch' and 'FIFO.finished' build a path to seed 'Player.play'. As such, the subroutines 'FIFO.launch' and 'FIFO.finished' are determined to be relevant to the user query, even though these subroutines 200 do not include any part of the search term 'play next'. The processing circuit 102 performs the outward navigation process for each of the remaining (lower ranked) seeds identified in the ranked list 600 of subroutines 200 determined as part of the prior code search process.

FIG. 7 shows the code navigation process for the exemplary ranked list of subroutines 200 illustrated in FIG. 6, based on the exemplary search term 'play next'. In one embodiment, the navigation process explores outward at most five call edges from each of the seeds (subroutines)

identified in the ranked list 600 of subroutines 200. Each call edge corresponds to a call from one subroutine 200 to another subroutine 200. In general, the navigation process discovers paths 700 from one seed 200 to another seed 200 and adds all subroutines 200 along each path to the final result for each starting seed in the ranked list 600 of subroutines 200. As such, one or more of the paths 700 from a starting seed 200 to an ending seed 200 can include at least one subroutine 200 devoid of any identifiers matching at least part of the search term (e.g., the subroutines 'FIFO-.launch' and 'FIFO.finished' in FIG. 7). The seed subroutines 200 are shown as solid boxes in FIG. 7, and the subroutines 200 added through the navigation process are shown as dashed boxes in FIG. 7. Some of the subroutines 200 added as part of the navigation process will remain in the final results shown in FIG. 8 and others will not as explained in more detail next.

Figure 8:
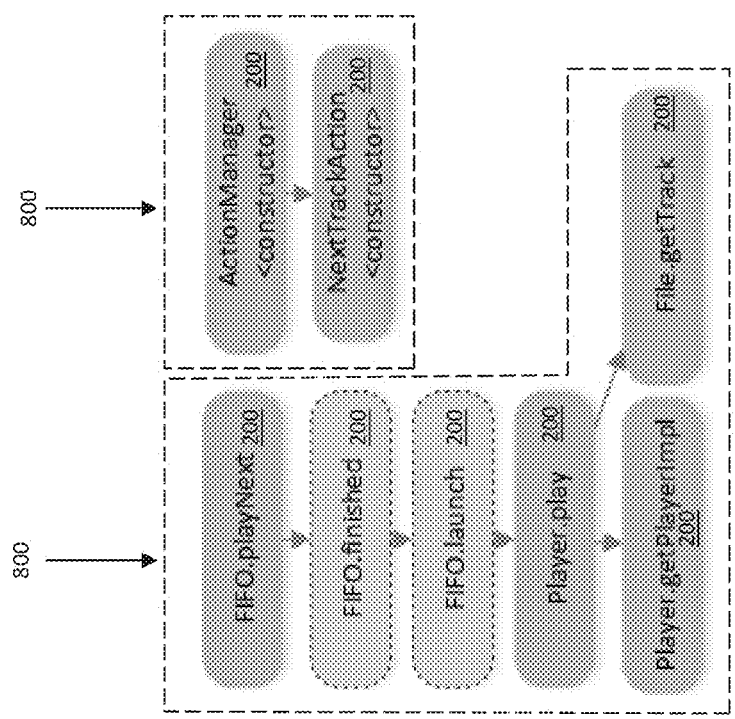
FIG. 8 illustrates a schematic diagram of the navigation results shown in FIG. 7 transformed into two connected call trees, which are subsequently presented as the top two results.

The grouping process takes the different paths 700 of subroutines 200 and groups them into connected call trees 800. For example, the previously unconnected search results shown in FIG. 6 plus the additional subroutines 200 discovered as part of the outward navigation process in FIG. 7 are transformed into two connected call trees 800 as shown in FIG. 8. As such, the tree-like search results are grouped into connected call trees 800 that now contain seeds (subroutines) 200 identified as part of the search process, together with additional structurally-related subroutines 200 identified during the automatic navigation process. To group results into connected call trees 800, the processing circuit 102 chooses the first seed 200 from the search result list 600, creates a new tree 800 and inserts it, and then adds subroutines 200 to this call tree 800 until no more subroutines 200 can be added. The subroutines 200 included in each path 700 are thus grouped into a connected call tree 800 by identifying the seed 200 at the beginning of each path 700, the seed 200 at the end of each path 700, and any subroutines 200 linked between the seeds 200 at the beginning and end of each path 700, even if these intermediary subroutines 200 do not include any part of the search term.

Not all of the additional subroutines 200 identified as part of the navigation process necessarily remain in the final results. In FIG. 8 for example, only the subroutines 'FIFO-.launch' and 'FIFO.finished' discovered as part of the navigation process are sufficiently linked between beginning and end seed subroutines 200 and therefore included in a connected call tree 800. The remaining subroutines 200 ('StopTrackAction <constructor>', 'Configuration.getBoolean', 'StopTrackAction.setShortDescription', and 'Util.stopWaiting' in FIG. 7) discovered as part of the navigation process are not sufficiently linked to seed subroutines 200 and therefore excluded from the connected call trees 800. This process is repeated until all seeds 200 in the search result list 600 are navigated outward and grouped.

The ranking process transforms the set of connected call trees 800 into a ranked list. The connected call trees 800 are eventually presented as the search results in a sequence diagram 400 based on the ranking. In FIG. 8, for example, the call tree 800 starting with 'FIFO.playNext' is ranked highest because the sum of its subroutine relevance scores is highest. This ranking scheme favors highly connected groups, which again reflects the high connectivity typically found developers' context models. In one embodiment, the relevance score indicates a frequency of occurrence of the search term or part of the search term in the subroutines 200 included in each connected call tree 800.

Figure 9:
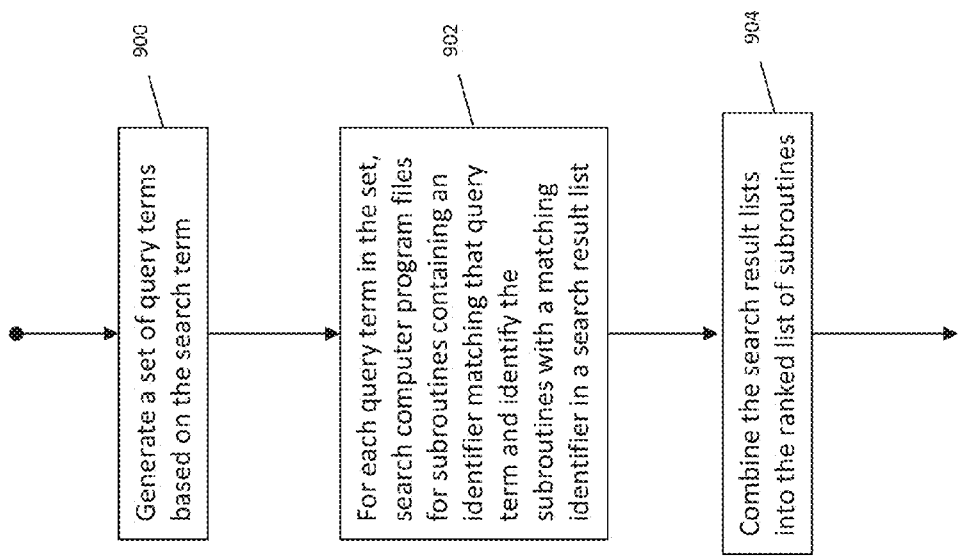
FIG. 9 illustrates a flow diagram of an embodiment of generating a ranked list of subroutines based on a search term.

FIG. 9 illustrates an embodiment of the search process, e.g. implemented by the processing circuit 102 to generate the ranked list 600 of subroutines 200, which in turn is used by the navigation process to determine the ranked list of connected call trees 800 displayed to the user. According to this embodiment, the search process has three stages: an expansion phase (900); an execution phase (902); and synthesis phase (904).

In the expansion phase (900), a set of query terms is generated based on the search term. One query term in the set matches the entire search term (e.g., 'play next' in the prior example) and the remaining query terms in the set match part of the search term (e.g., 'play' and 'next' in the prior example). The expansion phase (900) takes an initial query and creates a set of queries that contains all possible subsets of terms from the original query, i.e. transforming 'play next' into the set {'play', 'next', 'play next'}. Such an approach employs a systematic removal of words from the initial query, avoiding a failure to return anything of interest.

In the execution phase (902), the previously created queries are executed using known code search technology, outputting lists of relevant subroutines 200. For each query term in the set, the processing circuit 102 searches computer program files for subroutines 200 containing an identifier matching that query term and identifying the subroutines 200 with a matching identifier in a particular search result list. For example, a query for 'play next' locates methods such as 'FIFO.playNext' in the previous example given herein. The code search extracts these identifiers from each subroutine, creating information retrieval documents. These documents are later compared against a query, and the most similar subroutines 200 are returned.

In the synthesis phase (904), the search result lists are combined into a ranked list 600 of subroutines 200. The synthesis phase (904) collects all search result lists, one for each query, and combines them together into a single ranked list 600. For example, the 'play next' result list in the previous example may contain the subroutine 'FIFO.playNext' while the 'next' result list may begin with the subroutine 'FIFO.next' but also contain the subroutine 'FIFO.playNext'. Interleaving, such as the known 'Team-Draft Interleaving', can be used to combine these possibly overlapping result lists. This approach operates as a draft, choosing the highest remaining item from each result list during each round, resulting in a list 600 similar to what is shown in FIG. 6.

The visualization stage occurs after the search and navigation stages, using ranked call trees 800 as input and presenting them as sequence diagrams 400 by traversing the trees 800 and creating a lifeline for each new class and a message for each subroutine call. For example, both trees 800 shown in FIG. 8 can be visualized as a sequence diagram 400 with the higher-ranked tree 800 shown at the top of the diagram.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method of facilitating software code changes, the method comprising:
receiving as input a user query specifying a search term;
generating a ranked list of method program elements, each of the method program elements included in the ranked list containing an identifier matching at least part of the search term and serving as a seed for later navigation;
navigating outward from each seed a defined number of call edges, each of the call edges corresponding to a call from one method program element to another method program element regardless of whether the method program elements which are navigated outward from each of the seeds contains an identifier matching any part of the search term,
identifying paths from one of the seeds to another one of the seeds based on the outward navigation from each of the seeds;
grouping the method program elements included in each of the paths into a corresponding connected call tree;
identifying a seed at a beginning of each path, a seed at an end of each path, and any method program elements linked between the seeds at the beginning and end of each path;
excluding from the connected call trees the method program elements discovered as part of the outward navigation which are not included in a path that begins with one of the seeds and ends with another one of the seeds, and retaining in the connected call trees the method program elements discovered as part of the outward navigation which are included in a retained path that begins with one of the seeds and ends with another one of the seeds regardless of whether all method program elements in the retained path contains an identifier matching any part of the search term;
ranking the connected call trees to form a ranked list of connected call trees; and
displaying the ranked list of connected call trees as a diagram.

2. The method according to claim 1, wherein generating the ranked list of method program elements comprises:
generating a set of query terms based on the search term, one query term in the set matching the entire search term and the remaining query terms in the set matching a part of the search term;
for each query term in the set, searching computer program files for method program elements containing an identifier matching that query term and identifying the method program elements with a matching identifier in a search result list; and
combining the search result lists into the ranked list of method program elements.

3. The method according to claim 1, wherein one or more of the paths includes at least one method program element devoid of any identifiers matching at least part of the search term.

4. The method according to claim 1, wherein each seed is navigated outward by up to five call edges using a call graph.

5. The method according to claim 1, further comprising:
determining a relevance score for each connected call tree; and
ranking the connected call trees based on the relevance scores to generate the ranked list of connected call trees.

6. The method according to claim 5, wherein the relevance score indicates a frequency of occurrence of the search term or part of the search term in the method program elements included in each connected call tree.

7. The method according to claim 1, wherein the user query corresponds to a code modification or a code bug.

8. The method according to claim 1, wherein the ranked list of connected call trees is displayed as a sequence diagram.

9. A non-transitory computer readable medium storing a computer program configured to facilitate software code changes, the computer program comprising:
program instructions to receive as input a user query specifying a search term;
program instructions to generate a ranked list of method program elements, each of the method program elements included in the ranked list containing an identifier matching at least part of the search term and serving as a seed for later navigation;
program instructions to navigate outward from each seed a defined number of call edges, each of the call edges corresponding to a call from one method program element to another method program element regardless of whether the method program elements which are navigated outward from each of the seeds contains an identifier matching any part of the search term,
program instructions to identify paths from one of the seeds to another one of the seeds based on the outward navigation for each of the seeds;
program instructions to group the method program elements included in each of the paths into a corresponding connected call tree;
identify a seed at a beginning of each path, a seed at an end of each path, and any method program elements linked between the seeds at the beginning and end of each path;
program instructions to exclude from the connected call trees the method program elements discovered as part of the outward navigation which are not included in a path that begins with one of the seeds and ends with another one of the seeds, and retain the remaining connected call trees regardless of whether all method program elements included in the remaining connected call trees contains an identifier matching any part of the search term;
program instructions to rank the connected call trees to form a ranked list of connected call trees; and program instructions to display the ranked list of connected call trees as a diagram.

10. The non-transitory computer readable medium according to claim 9, further comprising:
program instructions to generate a set of query terms based on the search term, one query term in the set matching the entire search term and the remaining query terms in the set matching only part of the search term;
for each query term in the set, program instructions to search computer program files for method program elements containing an identifier matching that query term and identify the method program elements with a matching identifier in a search result list; and
program instructions to combine the search result lists into the ranked list of method program elements.

11. The non-transitory computer readable medium according to claim 9, further comprising:
- program instructions to determine a relevance score for each connected call tree; and
- program instructions to rank the connected call trees based on the relevance scores to generate the ranked list of connected call trees.

12. A computer system comprising a hardware processing circuit configured to:
- receive as input a user query specifying a search term;
- generate a ranked list of method program elements, each of the method program elements included in the ranked list containing an identifier matching at least part of the search term and serving as a seed for later navigation;
- navigate outward from each seed a defined number of call edges, each of the call edges corresponding to a call from one method program element to another method program element regardless of whether the method program elements which are navigated outward from each of the seeds contains an identifier matching any part of the search term,
- identify paths from one of the seeds to another one of the seeds based on the outward navigation for each of the seeds;
- group the method program elements included in each of the paths into a corresponding connected call tree;
- identify a seed at a beginning of each path, a seed at an end of each path, and any method program elements linked between the seeds at the beginning and end of each path;
- exclude from the connected call trees the method program elements discovered as part of the outward navigation which are not included in a path that begins with one of the seeds and ends with another one of the seeds, and retain the remaining connected call trees regardless of whether all method program elements included in the remaining connected call trees contains an identifier matching any part of the search term;
- rank the connected call trees to form a ranked list of connected call trees; and
- display the ranked list of connected call trees as a diagram.

13. The computer system according to claim 12, wherein the hardware processing circuit is further configured to:
- generate a set of query terms based on the search term, one query term in the set matching the entire search term and the remaining query terms in the set matching only part of the search term;
- for each query term in the set, search computer program files for method program elements containing an identifier matching that query term and identify the method program elements with a matching identifier in a search result list; and
- combine the search result lists into the ranked list of method program elements.

14. The computer system according to claim 12, wherein the hardware processing circuit is further configured to navigate outward from each seed by up to five call edges using a call graph.

15. The computer system according to claim 12, wherein the hardware processing circuit is further configured to:
- determine a relevance score for each connected call tree; and
- rank the connected call trees based on the relevance scores to generate the ranked list of connected call trees.

* * * * *